US011606125B2

(12) United States Patent
Aue

(10) Patent No.: US 11,606,125 B2
(45) Date of Patent: Mar. 14, 2023

(54) BEAMFORMING ANTENNA, MEASUREMENT DEVICE, ANTENNA MEASUREMENT SYSTEM AND METHOD

(71) Applicant: XILINX, INC., San Jose, CA (US)

(72) Inventor: Volker Aue, Dresden (DE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/964,581

(22) PCT Filed: Jan. 30, 2019

(86) PCT No.: PCT/EP2019/052198
§ 371 (c)(1),
(2) Date: Jul. 23, 2020

(87) PCT Pub. No.: WO2019/149729
PCT Pub. Date: Aug. 8, 2019

(65) Prior Publication Data
US 2021/0367648 A1    Nov. 25, 2021

(30) Foreign Application Priority Data

Feb. 1, 2018  (EP) .................................. 18154619

(51) Int. Cl.
*H04B 7/06* (2006.01)
*H04B 17/18* (2015.01)
(Continued)

(52) U.S. Cl.
CPC ........... *H04B 7/0617* (2013.01); *H01Q 3/267* (2013.01); *H04B 17/18* (2015.01); *H04B 17/21* (2015.01)

(58) Field of Classification Search
CPC ...... H04B 7/0617; H04B 17/18; H04B 17/21; H01Q 3/267
(Continued)

(56) References Cited

U.S. PATENT DOCUMENTS

| | | | | |
|---|---|---|---|---|
| 2005/0282506 A1* | 12/2005 | Azuma | ................ | H04B 17/102 455/101 |
| 2006/0019712 A1* | 1/2006 | Choi | ...................... | H04B 17/21 455/562.1 |

(Continued)

FOREIGN PATENT DOCUMENTS

EP    2911323 A1    8/2015

OTHER PUBLICATIONS

International Search Report and Written Opinion Application No. PCT/EP2019/052198, dated Mar. 6, 2019 consists of 16 pages.
(Continued)

*Primary Examiner* — Eugene Yun
(74) *Attorney, Agent, or Firm* — Patterson + Sheridan, LLP

(57) ABSTRACT

The present invention provides a beamforming antenna (100, 200, 400) comprising a plurality of antenna elements (101, 102, 201, 202, 401, 402, 440), and a signal generator (103, 403) that is configured to generate for each one of the antenna elements (101, 102, 201, 202, 401, 402, 440) a calibration signal (106, 107, 206, 406, 335) for radiation by the respective antenna element (101, 102, 201, 202, 401, 402, 440) and to supply the generated calibration signals (106, 107, 206, 406, 335) to the respective antenna elements (101, 102, 201, 202, 401, 402, 440). Further, the present invention provides a measurement device (330, 430) for measuring properties (336) of a beamforming antenna (100, 200, 400) according to any one of the preceding claims via calibration signals (106, 107, 206, 406, 335) emitted by antenna elements (101, 102, 201, 202, 401, 402, 440) of the beamforming antenna (100, 200, 400), the measurement device (330, 430) comprising a measurement receiver (332) that is configured to receive an incoming signal (334) comprising the calibration signals (106, 107, 206, 406, 335), and a property determination module (333) that is coupled to (Continued)

the measurement receiver (332) and that is configured to determine the properties (336) of the beamforming antenna (100, 200, 400) based on the received calibration signals (106, 107, 206, 406, 335). Further, the present invention provides a respective antenna measurement system (450) and a respective method.

20 Claims, 5 Drawing Sheets

(51) Int. Cl.
  *H04B 17/21* (2015.01)
  *H01Q 3/26* (2006.01)
(58) Field of Classification Search
  USPC .................................................... 455/562.1
  See application file for complete search history.

(56) References Cited

U.S. PATENT DOCUMENTS

| | | | |
|---|---|---|---|
| 2007/0225042 A1* | 9/2007 | Kitahara | H04B 17/12 455/67.11 |
| 2012/0001810 A1 | 1/2012 | Soualle et al. | |
| 2015/0372744 A1* | 12/2015 | Lehtinen | H01Q 3/40 370/329 |
| 2016/0254870 A1* | 9/2016 | O'Keeffe | H04B 17/14 455/67.14 |
| 2017/0223559 A1 | 8/2017 | Kong et al. | |

OTHER PUBLICATIONS

Lyalin Konstantin S et al., "Approach to use pseudo-noise calibration method for wideband calibration of antenna arrays", 2017 IEEE Confernce of Russian Young Researchers in Electrical and Electronic Engineering (EICONRUS), IEEE, Feb. 1, 2017 (Feb. 1, 2017), pp. 1257-1260, XP033088852, DOI:10.1109/EICONRUS. 2017-.7910793.

* cited by examiner

BEAMFORMING ANTENNA, MEASUREMENT DEVICE, ANTENNA MEASUREMENT SYSTEM AND METHOD

TECHNICAL FIELD

The invention relates to a beamforming antenna and a respective measurement device. Further, the present invention refers to an antenna measurement system and a respective method.

BACKGROUND

Although applicable to any wireless communication system, the present invention will mainly be described in conjunction with the $5^{th}$ generation of wireless communication networks, also referred to as 5G-Networks.

Today wireless communication networks are widely used for providing voice and data communication to users. Such wireless communication networks, like e.g. LTE based or so called 4G networks, usually comprise a core network and a so called radio access network or RAN. It is understood, that each of these interrelated networks may comprise a plurality of different elements, modules or units that together provide the required communication capabilities.

As part of the RAN so called eNodeBs or base stations provide the link between the operators network and the users mobile devices or user equipments (UEs). Usually the eNodeBs will comprise antennas that serve for transmitting outgoing signals to the UEs and for receiving incoming signals from the UEs. Up to now, most commonly passive or active antennas with fixed radiation patterns are used.

Operators of such wireless communication networks usually need to install, turn-up, and maintain their networks. To this end, it is important for a network operator to know, if the antenna is (still) working as expected.

Today technicians of a network operator may e.g. perform tests on installed antenna systems by injecting a test signal into the antenna that is then emitted by the antenna as a whole. The technician may e.g. use a handheld tester in the field to
- validate cellular radio access network (C-RAN) connectivity in the field by performing measurements at multiple locations in the field;
- identify passive intermodulation (PIM);
- validate radio emission conformance.

A major drawback of this approach is that it cannot be used while the antenna is operating in the live network. It is useful mostly for testing the antenna during installation of the antenna. There also exists test equipment that may evaluate the LTE signals as transmitted in a live network and may measure parameters such as RSRP for received signal strength and Cell ID to identify which cells are visible.

Today's antenna measurement or test systems like e.g. the Anritsu MT8221B BTS Master or the R&S® TSME Ultra-compact Drive Test Scanner share the assumption of a fixed radiation pattern at the eNodeB or base station.

The present measurement solutions therefore offer very little flexibility.

Accordingly, there is a need for an improved antenna measurement system.

SUMMARY OF THE INVENTION

The present invention provides a beamforming antenna with the features of claim 1, a measurement device with the features of claim 7, an antenna measurement system with the features of claim 11 and a method with the features of claim 12.

Accordingly, it is provided:

A beamforming antenna comprising a plurality of antenna elements, and a signal generator that is configured to generate for each one of the antenna elements a calibration signal for radiation by the respective antenna element and to supply the generated calibration signals to the respective antenna elements.

Further, it is provided:

A measurement device for measuring properties of a beamforming antenna according to the present invention via calibration signals emitted by antenna elements of the beamforming antenna, the measurement device comprising a measurement receiver that is configured to receive an incoming signal comprising the calibration signals, and a property determination module that is coupled to the measurement receiver and that is configured to determine the properties of the beamforming antenna based on the received calibration signals.

In addition, it is provided:

An antenna measurement system comprising a beamforming antenna according to the present invention, and a measurement device according to the present invention.

Further, it is provided:

A method for measuring properties of a beamforming antenna according to the present invention, the method comprising generating for each one of a plurality of antenna elements of the beamforming antenna a respective calibration signal, emitting the generated calibration signals via the antenna elements of the beamforming antenna, receiving the calibration signals at a measurement device, and determining the properties of the beamforming antenna based on the received calibration signals.

The present invention is based on the fact that in modern wireless communication systems antennas may comprise variable antenna patterns instead of static antenna patterns. Such antennas with variable antenna patterns may e.g. be called beamforming antennas, active antennas or massive MIMO antenna array.

Such antennas usually comprise a plurality of single antenna elements and a dedicated signal processing chain for each of the single antenna elements. The individual signal processing chains may e.g. comprise the circuitry required to convert a digital signal that is provided for the respective antenna element into an analog signal, e.g. a digital to analog converter, and to amplify the analog signal accordingly for emission by the respective antenna element, e.g. an amplifier. It is understood, that other components, like e.g. an up-converter, filters or the like, may be provided between the digital to analog converter and the amplifier or between the amplifier and the antenna element. A beamforming antenna may further comprise a beamforming logic that comprises an interface to a so called base band unit and that is coupled to the single antenna elements and provides the respective digital signals. The base band unit may e.g. send IQ signals via a CPRI interface. The beamforming logic may then calculate phase offsets and amplitude values for the digital signals that are provided to each of the antenna elements via the respective signal processing chain to form the respective beams. The mapping of M signal streams for the base station (e.g. IQ signals) to the N antenna elements results in M×N, where N can be much larger than M (N>>M). It is understood, that respective signal processing chains may also be provided for signals received by the single antenna elements. It is further understood, that in the receiving direction beamforming may also be applied. A beamforming antenna or massive MIMO antenna array may therefore comprise a transmitter and a receiver for every single antenna element.

With a beamforming antenna or a massive MIMO antenna array it is therefore possible to alter the antenna pattern in transmission direction and in reception direction by applying respective phase offsets and attenuations to the signals that are emitted or received by the single antenna elements.

If a network operator uses such a beamforming antenna or a massive MIMO antenna array the operator may therefore require a much more detailed analysis of a beamforming antenna or a massive MIMO antenna array than this is required for antennas with a fixed radiation pattern.

In a beamforming antenna or a massive MIMO antenna array, each transmitter and receiver needs to be calibrated. Calibration is necessary to maintain the phase, time, and amplitude coherence between the different transmitters and receivers. Usually, such a calibration will be performed by a calibration device inside the beamforming antenna or massive MIMO antenna array.

The present invention now provides a method for verifying the correct functionality of such a beamforming antenna or a massive MIMO antenna array.

To this end, the present invention provides the signal generator in the beamforming antenna that is capable of generating individual calibration signals for every single antenna element of the beamforming antenna or massive MIMO antenna array. The signal generator may e.g. comprise a signal generation element that is coupled to an interface to each one of the antenna elements. The signal generator injects the calibration signals into the signal processing chains of the respective antenna elements via this interface. This means, that the individual calibration signals will be emitted by the antenna elements of the beamforming antenna or massive MIMO antenna array.

In addition, the antenna measurement system comprises a measurement receiver that receives the individually emitted calibration signals from the antenna elements of the beamforming antenna or massive MIMO antenna array. It is understood, that although not explicitly mentioned, the measurement device, especially the measurement receiver, may comprise an antenna for receiving the incoming signals from the beamforming antenna. Further additional circuitry, like e.g. filters, attenuators, amplifiers, mixers or the like, may be provided between the antenna and the following elements of the measurement receiver.

The measurement receiver then provides the received calibration signals to a property determination module. The property determination module will then determine the required or requested properties of the beamforming antenna or massive MIMO antenna array based on the received calibration signals. It is understood, that the terms "properties of the beamforming antenna" may refer to properties of the antenna itself as well as to properties of the signal propagation path between the antenna and the measurement device.

The calibration signals may be seen as a kind of specific code for the single antenna elements that may be received and differentiated in the measurement device. This means that the measurement device may know the single codes or calibration signals and is capable of mapping or matching the single calibration signals it receives to the respective antenna elements.

It is understood, that the signal generator may also provide the same calibration signal to all antenna elements. This means that the individual calibration signals for the different antenna elements are all identical. This allows measuring the superimposed communication channel in a single measurement.

With the present invention it is therefore possible to perform measurements not only of an antenna as a whole. Instead by providing individual calibration signals to the single antenna elements of the beamforming antenna or massive MIMO antenna array, it becomes possible to measure properties of the signal path between every single antenna element and the measurement receiver.

The present invention therefore allows performing in-depth measurements and deriving a plurality or properties for a beamforming antenna or a massive MIMO antenna array.

Since a beamforming antenna, e.g. in a base station of a cellular communication network, has several radiating antenna elements, for each antenna element there exists a radio channel from that antenna element to the UE. In difficult reception locations, RF engineers of a network operator may e.g. be capable in answering the following questions with the present invention:

Which antenna elements are seen by a UE?
What is the receive signal power for each antenna element?
Can the receive signal power of a particular base station at the location of the measurement device be increased through a different beamforming vector at the base station?
Can the signal strength of a particular base station at the location of the measurement device be reduced through a specific beamforming vector?
Are all antenna elements of the base station antenna radiating the signal as expected?

Further, a coverage map for a beamforming antenna may be generated. Such a coverage map may consist of the following parameters:

Received signal strength of the signals transmitted of each antenna element of the base station obtained at the measurement antenna.
Received relative phase of the signals transmitted from each antenna element of the base station obtained at the location of the measurement antenna.

The mobile radio channel in general can be characterized by its time-varying and time dispersive nature. For (near) line of sight situations, where the base station may be somewhat elevated and the signal reaches the antenna of the measurement device through reflections of nearby scatterers, the wide-sense stationary uncorrelated scatterers (WSSUS) channel model is often used.

For signals, where the time dispersity is lower than the inverse of the channel bandwidth and for fixed locations and scatterers, the communication channel becomes an attenuation and phase with a fixed latency. Attenuation of phase and latency can be expressed by a complex constant $h\_i$, where i denotes the index for the path from the i-th antenna element to the antenna of the measurement device.

In line-of-sight (LoS) scenarios or near-LOS (NLOS), for a particular location of the measurement device, a relatively high correlation of the channel weights $h\_i$ exists. With knowledge of those channel coefficients, beamforming weights can be calculated that optimize the signal reception at the location of the receiver. Depending on the objective, there are different optimization criteria. These can for example be:

Maximum signal strength at the location of the measurement antenna: The base station may optimize the beam forming weights such that the received signal power at the location of the measurement antenna is maximized.

Minimum interference at the location of the measurement antenna: The base station may optimize the beam forming weights such that the received signal power of other user signals sent by the base station is minimized.

In NLOS propagation scenarios, this optimization may only be possible over the ensemble average in a statistical sense. In this case, it may be desirable to find the set of beam forming weights that maximize the received signal power at multiple locations of the measurement antenna in a statistical sense.

Similarly, it may be desirable to find the set of beam forming weights that minimize the received signal power of other user signals at multiple location of the measurement antenna in a statistical sense.

Therefore, the knowledge of the channel estimates that may be determined with the present invention can be used at the base station to select the proper beamforming weights to improve coverage, user level performance or cell throughput for the coverage area.

Further embodiments of the present invention are subject of the further subclaims and of the following description, referring to the drawings.

In an embodiment, the signal generator may be configured to generate orthogonal signals or quasi-orthogonal signals as calibration signals.

Orthogonal signals are mutually independent. This means that orthogonal signals may be transmitted simultaneously and may still be separated on the receiving side. Therefore, by using orthogonal signals as calibration signals, it is possible to transmit two or more calibration signals in parallel to the measurement device. The measurement device will then still be able to separate the calibration signals that are transmitted in parallel and perform separate evaluations on the single calibration signals.

The orthogonal calibration signals may be distinguished in the measurement device from each other by a unique signature. The unique signature may e.g. comprise:

The period, when the signal is sent.
The frequency on which the signal is sent,
The PN-code in case the calibration signal is a pseudo-noise signal
In a more generic sense: by its waveform
In case of the PN-code: by its pseudo random binary sequence.

A signature may in general be any property of the calibration signals that allows distinguishing a calibration signal from other calibration signals. A signature can e.g. be anything starting from a modulated binary sequence that is distinguished through the different binary sequences to signals that are unique with respect to their time or spectral characteristics. For example, calibration signals may be sent one after the other to avoid interference in the measurement receiver by other calibration signals.

The signal generator may comprise an arbitration logic that may e.g. perform an arbitration between single ones of the antenna elements or groups of the antenna elements.

The beamforming antenna may e.g. comprise a large number of antenna elements, like e.g. 8×8=64 or more than 100. In such cases it may e.g. be required to limit the number of concurrently transmitted calibration signals, either because it may be difficult to generate such a large number of orthogonal signals or because the measurement device may have limited signal reception or processing capabilities.

In such a case, the arbitration logic may select single antenna elements or groups of antenna elements in a sequential order for transmission of the calibration signals. The arbitration logic may e.g. sequentially select groups of 2, 4, 8, or 16 antenna elements for transmission of the calibration signals until all antenna elements have been selected for transmission of the calibration signals at least once. It is understood, that the arbitration logic may then repeat the sequence. It is further understood, that the numbers of 2, 4, 8 or 16 antenna elements have just exemplarily been chosen and that any other number of antenna elements may be used to form the groups.

If the arbitration logic is used to select single ones of the antenna elements or groups of antenna elements, it may be required to know at the measurement device, which antenna elements are active at each moment in time. To this end, a communication channel may be provided between the beamforming antenna and the measurement device. The measurement device may e.g. actively control the arbitration logic or actively select the antenna elements that are activated or grouped. As alternative, the arbitration logic may inform the measurement device of the antenna element or groups of antenna elements that are used in each case to transmit the calibration signals.

It is understood, that if at any moment in time only a single one of the antenna elements is used to transmit a calibration signal, the orthogonality of the calibration signals is not required. In fact, in this case the same calibration signal may be transmitted via every one of the antenna elements. Different calibration signals may however still be used to signal to the measurement device which antenna element is now transmitting or that the next antenna element in a sequence, especially a predefined sequence, is transmitting the calibration signal.

In another embodiment, the signal generator may be configured to generate pseudo noise signals, especially band-limited pseudo noise signals, as calibration signals.

Pseudo noise signals, also called pseudorandom noise signals, are signals similar to noise. This also implies that they are usually transmitted with a signal level that is below the noise level of the communication channel. The pseudo noise signal may e.g. comprise respective predetermined pseudo-random binary sequences.

Pseudo noise signals usually satisfy one or more of the standard tests for statistical randomness. Although pseudo noise signals seem to lack any definite pattern, pseudo noise signals consist of a deterministic sequence that will repeat itself after its period. In for example spread-spectrum systems, the receiver may correlate a locally generated signal with the received signal. The locally generated signal will be the same signal as the pseudo random signal. This makes sure that the receiver's locally generated sequence has a very high correlation with the transmitted sequence.

Since the level of the pseudo noise signals is below the noise level of the communication channel, the pseudo noise signals may be transmitted together with the signals that are transmitted by the beamforming antenna during normal operation, e.g. to perform communication with a user equipment. The communication with the user equipment will not be negatively influenced by a signal that is below the noise level of the communication channel. At the same time the measurement device may receive the pseudo noise signals by performing a correlation with a local copy or a local version of the respective pseudo noise signals.

Especially using a combination of orthogonal signals and pseudo noise signals it is possible, to transmit multiple calibration signals via the antenna elements during normal operation of the beamforming antenna without interruption or interference with the normal operation of the beamforming antenna.

Such a combination of orthogonal signals and pseudo noise signals may therefore be used to test a beamforming antenna or to determine properties of the beamforming antenna while the antenna is operating as a component of a network operator's wireless network without any interruption.

In order to allow the measurement device to correctly determine, which signals to process of all received signals, the calibration signals may be transmitted in a fixed timing which may e.g. be locked to a common time base that is common to the beamforming antenna and to the measurement receiver. Such a time base may e.g. be provided by the GPS (Global Positioning System) and may be known in the beamforming antenna and at the receiver. Further, if a communication channel exists between the beamforming antenna and the measurement device, a clock synchronization may be performed between the two to establish a common time base.

Further, in a TDD system, the calibration signal may be transmitted only during the TX ON time. The TDD timing may e.g. be derived at the measurement device from the LTE signal during normal operation of the beamforming antenna.

In a further embodiment, the signal generator may comprise for every antenna element a signal output interface that is coupled to a signal processing chain of the respective antenna element, especially to a digital to analog converter of the respective signal processing chain.

The signal generator may e.g. be a single signal generator that is capable of providing multiple calibration signals, e.g. one for every one of the antenna elements. As alternative, the signal generator may comprise a single signal generation element for every antenna element. Such single signal generation elements may then e.g. be arranged decentrally directly in the respective signal processing chains. It is understood, that a central control unit may be provided that may be coupled to the single signal generation elements and that may control the operation of the single signal generation elements.

The beamforming antenna may further comprise for every antenna element a signal combiner that may combine digital signals from a beamforming logic of the beamforming antenna with the respective digital calibration signals. It is understood, that such a signal combiner may e.g. be provided as a digital adder that adds the values of the calibration signal to the values of the signal from the beamforming logic prior to providing the added signal e.g. to an analog to digital converter of the signal processing chain of the respective antenna element.

It is further understood, that other arrangements are possible. For example, the signal generator may comprise analog to digital converters and may output the calibration signals as analog signals. In such an embodiment, the signal combiner may be an analog signal combiner.

In an embodiment, the beamforming antenna may comprise a beamforming logic that is coupled to the antenna elements and that is configured to calculate antenna output signals based on incoming IQ signals and a respective beamforming information and to provide the antenna output signals to the single antenna elements, wherein the signal generator may be coupled to an input of the beamforming logic and is configured to provide the calibration signals as an IQ signal to the beamforming logic.

In this embodiment, the calibration signals are indirectly provided to the single antenna elements from the signal generator through the beamforming logic. The signal generator may provide an IQ signal to the beamforming logic together with respective beamforming information. The beamforming logic will then convert the IQ signals into waveforms (in digital or analog form) that are modified regarding phase and/or amplitude according to the beamforming information. When emitted by the single antenna elements, the signals that are emitted by the single antenna elements will overlap and form a beam with a direction of main or maximum radiation according to the beamforming information.

It is understood, that the beamforming logic may be the same beamforming logic that is used to receive IQ signals from a base band unit, BBU, and to generate the communication signals for the single antenna elements during normal operation of the beamforming antenna. The IQ signals from the BBU may e.g. be combined with the IQ signals from the signal generator prior to the beamforming logic or by the beamforming logic.

It is further understood, that the beamforming logic for the calibration signal may be another beamforming logic than the one that is connected to the BBU and is used for generating/processing the communication signals for the single antenna elements. Providing a separate beamforming logic for the calibration signal allows forming a separate beam with the calibration signals as is formed with the communication signals.

In an embodiment, the signal generator comprises one or more configurable signal generation units that are configured to generate the calibration signals. A configurable signal generation unit in this case refers to a unit that actively generates a signal base on respective configuration parameters. Such parameters may e.g. comprise the length of the respective calibration signal, and/or the signal levels of the calibration signals, and/or the frequency or frequency band for the respective calibration signal, and/or a modulation scheme for the respective calibration signal. Such a configurable signal generation unit may e.g. comprise a component like a communication controller that may be configured according to the configuration parameters to generate the calibration signals.

As an alternative, the signal generator may comprise one or more replay units and a respective signal memory. The replay units may be coupled to the signal memory, and the calibration signals may be stored in the signal memory. When a replay unit is required to produce a calibration signal it may access the memory, load the data of the respective calibration signal from the memory and output the data as the calibration signal.

It is understood, that the signal generator may, depending on its position in the beamforming antenna, provide digital or analog signals.

In a further embodiment, the beamforming antenna may comprise a control interface that is configured to receive and/or transmit control commands, especially from a measurement device according to the present invention.

The control interface may in the beamforming antenna e.g. be coupled to the signal generator or be implemented as part of the signal generator. Such a control interface may e.g. comprise a wired or wireless communication interface with the respective communication controllers and transceivers. Via the control interface the beamforming antenna may be controlled by an external entity, like e.g. the measurement device. It is however understood, that any other entity may control the beamforming antenna. For example a central control entity that is operated by a network operator may be provided. Such a central control entity may e.g. control the beamforming antenna and the measurement device at the same time. The term "control" in this regard may refer to actively providing control signals/instructions or to providing status information, like e.g. timing information, frequency information or the like.

The control interface may e.g. be a communication interface that provides direct communication with the beamforming antenna, like e.g. a WIFI interface or the like. As alternative, the control interface may be a communication interface that provides indirect communication with the beamforming antenna. The term "indirect communication" may e.g. refer to a communication that is performed via a network like e.g. the internet or via a network operator's own network. For example, the network operator may provide a dedicated server that provides an API or interface to control the beamforming antenna. In this case, the measurement device may e.g. access the server to control the beamforming antenna.

In a further embodiment, the measurement receiver may be configured to receive the incoming signal comprising orthogonal calibration signals and to separate the orthogonal calibration signals and to provide the separated orthogonal calibration signals to the property determination module.

In an embodiment, the measurement device may comprise a number of correlators, i.e. one or more, wherein the correlators may be configured to correlate the received signal with predetermined pseudo noise signals to extract the calibration signals from the received signal.

A correlator may match the signature sequences, i.e. the pseudo-random binary sequences that form the calibration signals, to detect the calibration signals in the received signal and improve the measurement results. Using the same receive antenna, the measurement device can then determine the received phases and amplitudes. In addition, the measurement device may e.g. determine its position in relation to the beamforming antenna by determining the beam pattern of the beamforming antenna based on the single calibration signals.

The measurement device may comprise a single correlator. However, in order to concurrently receive multiple calibration signals, the measurement device may also comprise one correlator for every pseudo noise signal that is emitted concurrently with other pseudo noise signals by the beamforming antenna. In addition, the predetermined pseudo noise signals will usually be the same signals as generated by the signal generator in the beamforming antenna for the single antenna elements.

In another embodiment, the measurement device may comprise a control interface that may be configured to receive and/or transmit control commands, especially from a beamforming antenna according to the present invention.

The control interface of the measurement device may e.g. be the counterpart to the control interface of the beamforming antenna. This means that the measurement device and the beamforming antenna may communicate with each other via the control interfaces, either to exchange control commands or other data. As explained above the control interface of the measurement device may either be directly coupled to the control interface of the beamforming antenna or indirectly, e.g. via a network operator's network.

It is understood, that the elements described above, like e.g. the signal generator and/or the measurement receiver and/or the property determination module may be provided at least in part as discrete hardware elements, as configurable logic circuitry, e.g. in an FPGA, as a firmware of a controller or as a combination of any of the above.

Summing up, with this invention, a measurement device that has knowledge of the calibration signals can in the field perform measurements with the following purposes:

The receiver may evaluate the channel of multiple antenna elements in parallel to obtain the full channel matrix in one measurement period.

The receiver may also determine a power delay profile from the measured PN sequences.

The measurement system may have means to detect malfunctions by cross-evaluating the signal transmitted at the different antenna elements.

The signature is created in the antenna in the operating system instead of in the base station or, as in channel sounding, in specific measurement equipment.

While the base station adds sounding signals per stream (precoded or non-precoded), the invention adds such signals to each antenna element. Therefore, the spatial resolution is much higher.

The proposed solution works in combination with any mobile communication standard.

The measurement according to the present invention can be non-intrusive. This means, that the base station can continue running in operational mode. In addition, the measurement can be done independently of what operations the base station scheduler is currently performing.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
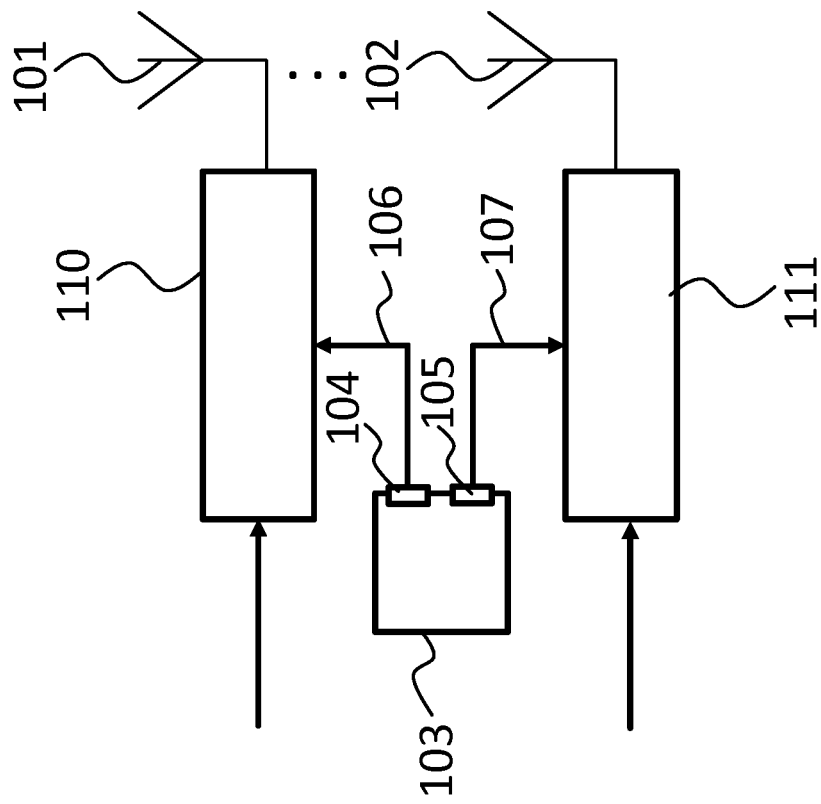
FIG. 1 shows a block diagram of an embodiment of a beamforming antenna according to the present invention.

FIG. 1 shows a block diagram of a beamforming antenna 100. The beamforming antenna 100 comprises a plurality of antenna elements 101, 102 of which only two are shown. It is understood, that the number of two antenna elements 101, 102 is just exemplarily chosen and that any other number of antenna elements may be provided in the antenna elements 101, 102 beamforming antenna 100. The beamforming antenna 100 comprises a signal processing chain 110, 111 for every one of the antenna elements 101, 102. The signal processing chains 110, 111 may comprise any digital and/or analog element that is required to provide communication signals to the antenna elements 101, 102 and to receive and process communication signals that are received via the antenna elements 101, 102. An exemplary arrangement of the signal processing chains 110, 111 will be shown in FIG. 2.

The beamforming antenna 100 further comprises a signal generator 103 that is coupled to the antenna elements 101, 102 via the signal processing chain 110, 111. It is understood, that the signal generator 103 may also be arranged at other positions in the beamforming antenna 100. The signal generator 103 may e.g. be arranged between the signal processing chains 110, 111 and the antenna elements 101, 102 or in parallel to the signal processing chains. 110, 111.

Figure 3:
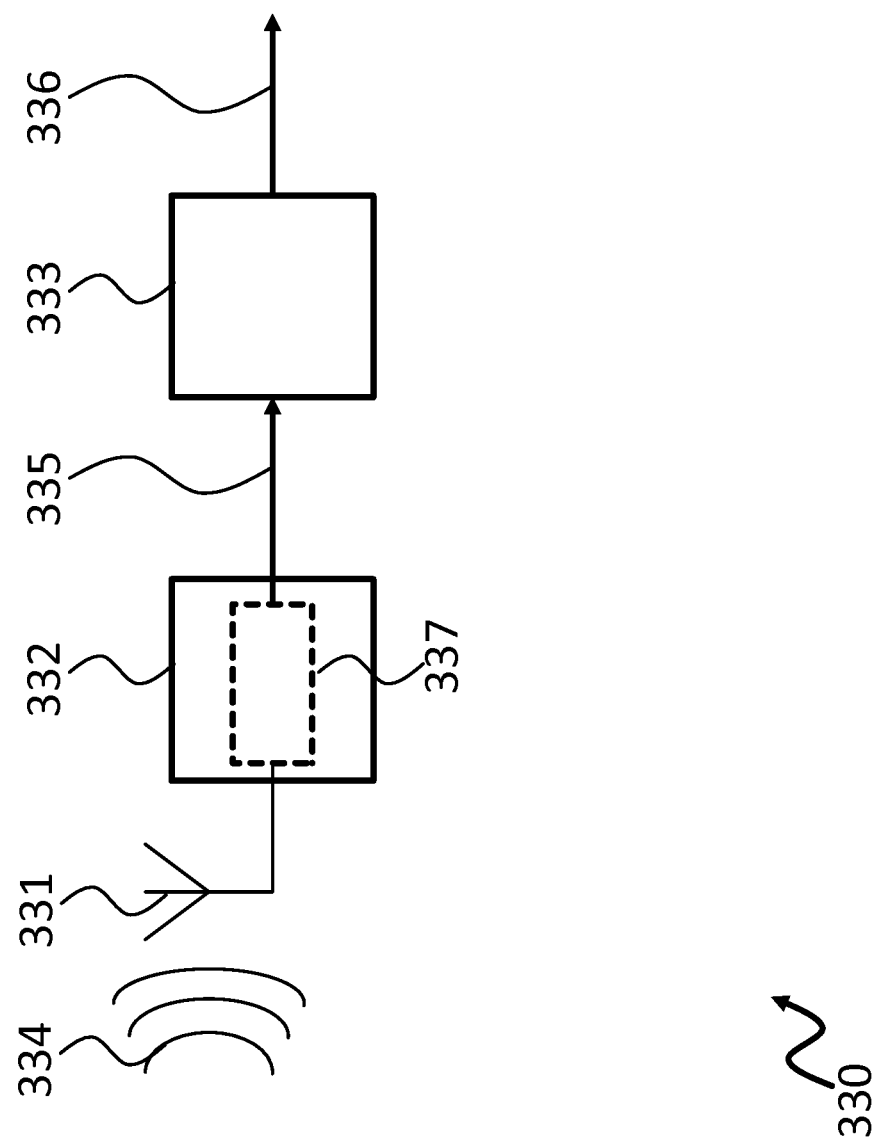
FIG. 3 shows a block diagram of an embodiment of a measurement device according to the present invention.

One of the main elements of the present invention is the signal generator 103. The signal generator 103 generates a calibration signal 106, 107 for each one of the antenna elements 101, 102. The respective antenna elements 101, 102 will then radiate the respective calibration signal 106, 107 that may then be received by a measurement device, e.g. a measurement device as shown in FIG. 3.

The calibration signals 106, 107 may e.g. be designed such that they may be distinguished in the measurement device from each other by a unique signature. The unique signature may e.g. comprise:

The period, when the signal is sent.
The frequency on which the signal is sent,
The PN-code in case the calibration signal is a pseudo-noise signal
In a more generic sense: by its waveform
In case of the PN-code: by its pseudo random binary sequence.

The calibration signals 106, 107 may therefore e.g. be provided as orthogonal signals or quasi-orthogonal signals.

If testing of or measuring parameters with the beamforming antenna 100 is required during normal operation of the beamforming antenna 100, the calibration signals 106, 107 may also be provided as pseudo noise signals, especially band-limited pseudo noise signals.

It is understood, that the signal generator 103 may generate the signals in real time with a signal generation unit. Such a signal generation unit may e.g. comprise respective oscillators, clocks, mixers or any other adequate element. As alternative, the signal generator 103 may replay stored signals. Such signals may e.g. be stored in a memory of the signal generator 103. It is further understood, that the function of the signal generator 103 may e.g. be provided with discrete hardware, (application specific) integrated circuits, as programmable logic in an FPGA or a CPLD or the like.

The signal generator 103 will therefore comprise a power supply input that is coupled to the internal elements of the signal generator 103. As mentioned before such internal elements may e.g. comprise oscillators, clock sources, processing elements, memories and the like. In an exemplary signal generator 103, a processing element and a memory may be coupled to each other and to a clock source, wherein all three elements may be supplied with electrical power via the power supply input. The processing element may during operation e.g. read a signal waveform from the memory and output the waveform either via a digital parallel interface or via a digital to analog converter as calibration signal. The signal generator 103 may also comprise a control interface that allows starting, stopping and configuring or controlling the signal generator 103.

Figure 2:
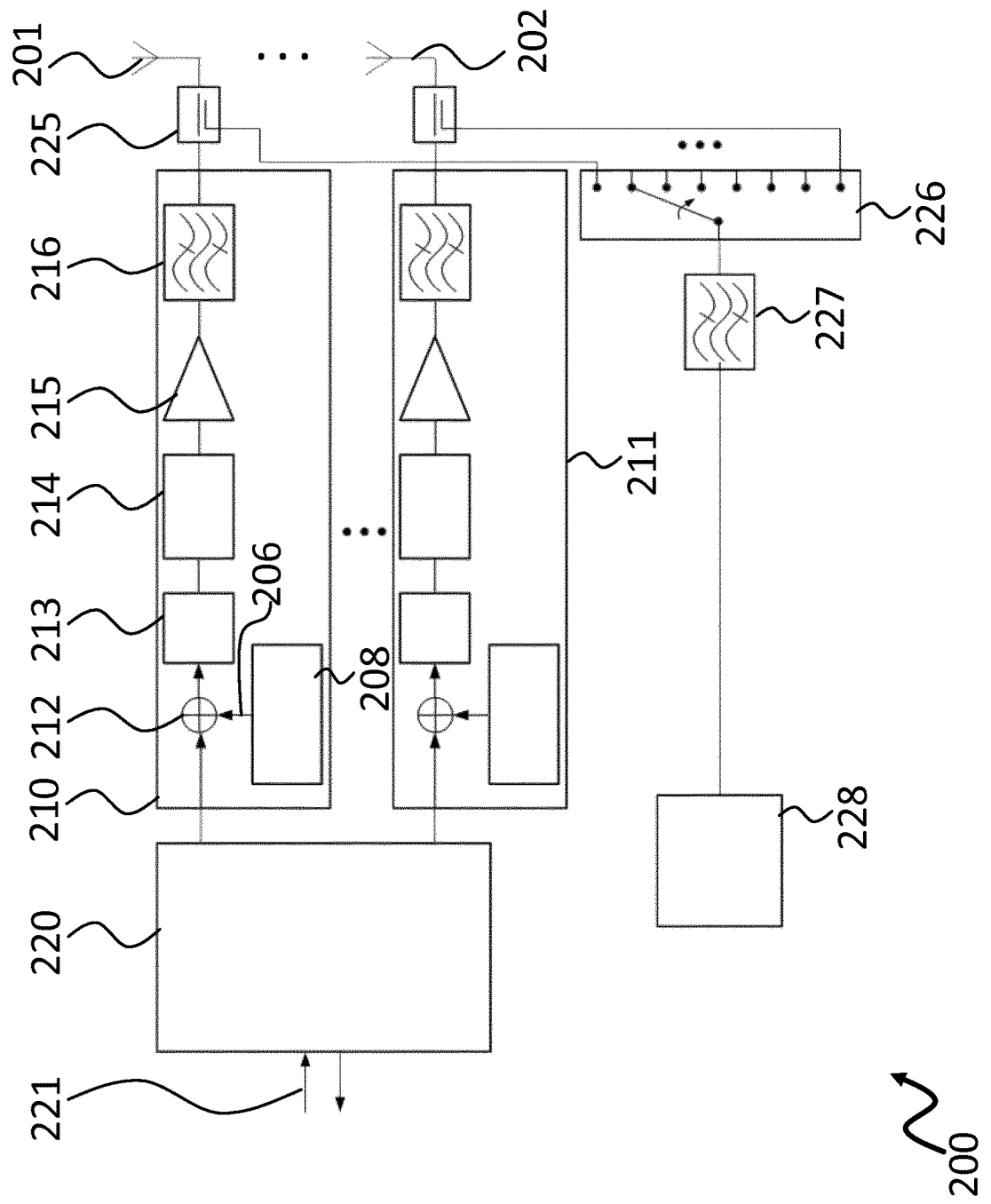
FIG. 2 shows a block diagram of an embodiment of a beamforming antenna according to the present invention.

FIG. 2 shows a block diagram of another beamforming antenna 200. The beamforming antenna 200 is based on the beamforming antenna 100. Therefore the beamforming antenna 200 also comprises two exemplary antenna elements 201, 202 that are each coupled to a signal processing chain 210, 211. Again, the number of two antenna elements 201, 202 is just exemplarily chosen and any other number of antenna elements 201, 202 is possible.

Only one of the signal processing chains 210, 211 will be explained in the following in detail. It is however understood, that the signal processing chains 210, 211 for the other antenna elements 201, 202 may be arranged analogously to the signal processing chain 210.

The signal processing chain 210 is coupled on the input side with a beamforming logic 220 and on the output side with the respective antenna element 201. The optional coupler 225 between the antenna element 201 and the signal processing chain 210 will be explained below. In the signal processing chain 210, a combiner 212 is coupled to the input and to a signal generation element 208. The output of combiner 212 is coupled to DAC 213 and the output of the DAC 213 is coupled to an up converter 214. The output of the up converter 214 is coupled to an amplifier 215 and the output of the amplifier 215 is provided to filter 216, and finally the output of filter 216 is provided to the antenna element 201 via the optional coupler 225.

It can be seen in the beamforming antenna 200 that the signal generator is not provided as a central device or unit. Instead, the signal generator is provided as a plurality of signal generation elements 208 that are each arranged in the respective signal processing chain 210, 211. The beamforming antenna 200 therefore comprises a decentralized signal generator. It is understood, that the single signal generation element 208 may comprise an arrangement as explained above for the signal generator 103. Further, it is understood, that although not shown the single signal generation elements 208 may comprise a control interface that allows controlling and e.g. synchronizing the single signal generation elements 208.

The beamforming antenna 200 further comprises a beamforming logic 220 that receives and outputs IQ signals 221, e.g. via a CPRI interface. The beamforming logic 220 may e.g. calculate the input signals for each signal processing chain 210, 211. Each signal processing chain 210, 211 then converts the signals from the digital domain to the analog domain with DAC 213. The signal is then upconverted by up converter 214, e.g. using a mixer. The up-converted signal is then amplified by amplifier 215 and then passed through a bandpass filter 216 before it is radiated by the respective antenna elements 201, 202.

The beamforming antenna 200 further comprises couplers 225 for the antenna elements 201, 202. The couplers 225 couple out a fraction of the signals that are provided to the antenna element 201 and provide these signal fractions to switch 226 for selecting one of the signal fractions. A bandpass filter 227 then filters out the relevant frequency ranges and provides the filtered signals to calibration receiver 228.

This arrangement serves for calibrating the elements of the signal processing chains 210, 211 of the single antenna elements 201, 202. With the present invention, the calibration signals 206 that are provided by the signal generation elements 208 may also be used for the internal calibration of the beamforming antenna 200. To this end, the calibration receiver may perform the same steps that are explained above and below for the measurement device 330 in order to process and analyze the calibration signals 206.

FIG. 3 shows a block diagram of a measurement device 330. The measurement device 330 comprises an antenna 331 that is coupled to a measurement receiver 332. The measurement receiver 332 is coupled to a property determination module 333.

During operation, the antenna 331 receives incoming signals 334. Such incoming signals 334 may comprise the calibration signals 335. The measurement receiver 332 extracts the calibration signals 335, if present in the incoming signals 334, and provides the calibration signals 335 to the property determination module 333. The property determination module 333 then determines the required properties of the beamforming antenna that is analyzed. It is understood, that this includes any parameters or properties of the signal propagation path between the beamforming antenna and the measurement device 330.

Figure 4:
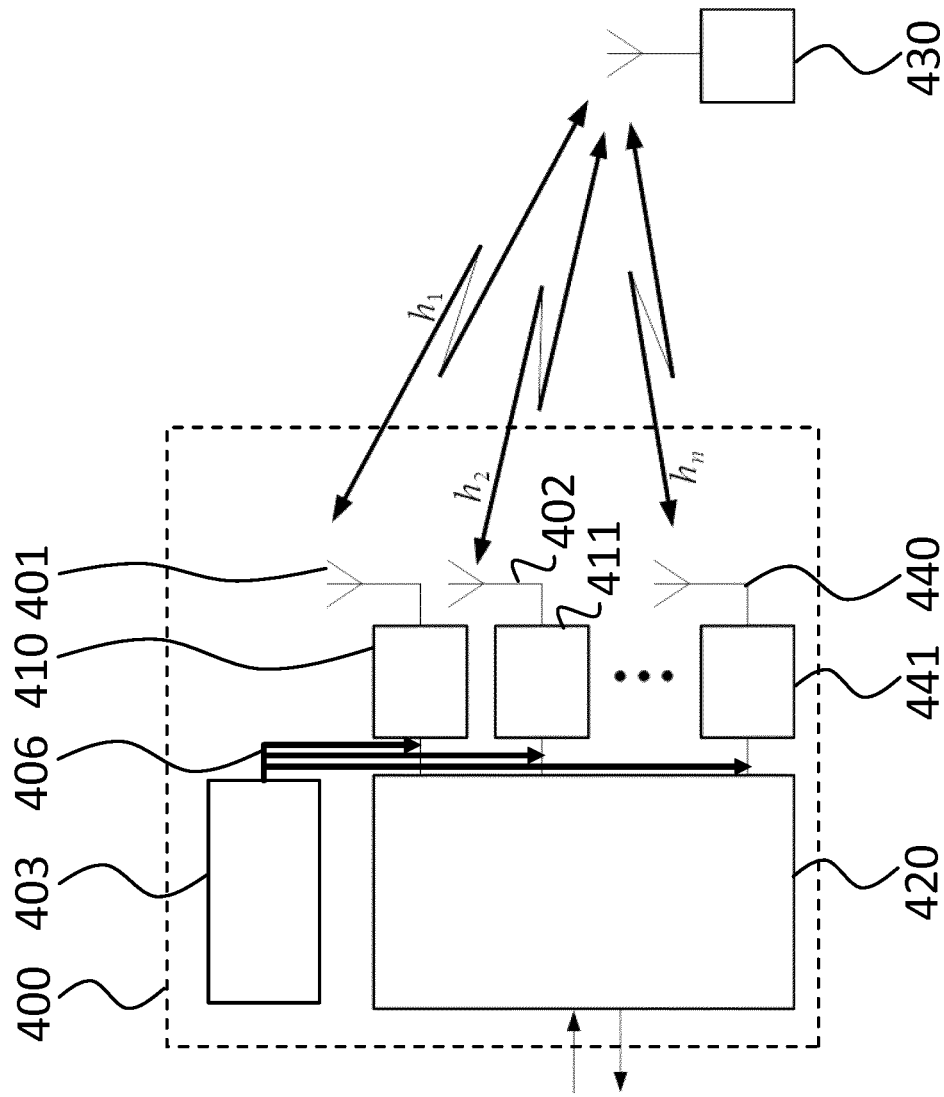
FIG. 4 shows a block diagram of an embodiment of an antenna measurement system according to the present invention.

FIG. 4 shows a block diagram of an embodiment of an antenna measurement system 450. The antenna measurement system 450 comprises a beamforming antenna 400 with three antenna elements 401, 402, 440. It is understood, that the number of three antenna elements 401, 402, 440 is just exemplarily chosen and that any other number of antenna elements 401, 402, 440 may also be used. The beamforming antenna 400 comprises a beamforming logic 420 that provides signal processing chains 410, 411, 441 with signals or receives respective signals during normal operation of the antenna measurement system 450. Further, the beamforming antenna 400 comprises a signal generator 403 that provides calibration signals 406 for the single antenna elements 401, 402, 440.

The beamforming antenna 400 communicates with a measurement receiver 430 via communication or signal paths h1, h2 and hn. It can be seen in FIG. 4 that a single signal path exists between every antenna elements 401, 402, 440 and the measurement receiver 430. The signal paths h1, h2 and hn may e.g. be defined by their signal propagation properties like e.g. a phase delay and an attenuation.

For sake of clarity in the following description of the method based FIG. 5 the reference signs used above in the description of apparatus based FIGS. 1-4 will be maintained.

Figure 5:
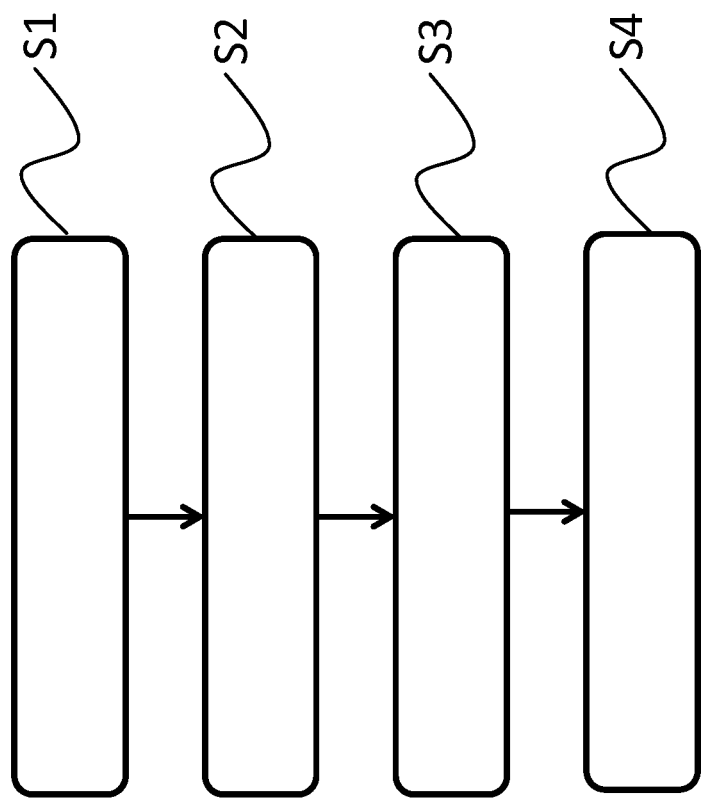
FIG. 5 shows a flow diagram of an embodiment of a method according to the present invention.

FIG. 5 shows a flow diagram of an embodiment of a method for measuring properties 336 of a beamforming antenna 100, 200, 400 according to the present invention.

The method comprises generating S1 for each one of a plurality of antenna elements 101, 102, 201, 202, 401, 402, 440 of the beamforming antenna 100, 200, 400 a respective calibration signal 106, 107, 206, 406, 335, emitting S2 the generated calibration signals 106, 107, 206, 406, 335 via the antenna elements 101, 102, 201, 202, 401, 402, 440 of the beamforming antenna 100, 200, 400, receiving S3 the calibration signals 106, 107, 206, 406, 335 at a measurement device 330, 430, and determining S4 the properties 336 of the beamforming antenna 100, 200, 400 based on the received calibration signals 106, 107, 206, 406, 335.

Generating S1 calibration signals 106, 107, 206, 406, 335 may comprise generating orthogonal signals or quasi-orthogonal signals as calibration signals 106, 107, 206, 406, 335. The method may then further comprise separating the orthogonal calibration signals 106, 107, 206, 406, 335 in the measurement device 330, 430 prior to determining the properties 336 of the beamforming antenna 100, 200, 400.

Generating S1 calibration signals 106, 107, 206, 406, 335 may comprises generating pseudo noise signals, especially band-limited pseudo noise signals, as calibration signals 106, 107, 206, 406, 335. The method may further comprise correlating the received calibration signals 106, 107, 206, 406, 335 with predetermined pseudo noise signals to extract the calibration signals 106, 107, 206, 406, 335 from the signal received at the measurement device 330, 430.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present invention provides a beamforming antenna 100, 200, 400 comprising a plurality of antenna elements 101, 102, 201, 202, 401, 402, 440, and a signal generator 103, 403 that is configured to generate for each one of the antenna elements 101, 102, 201, 202, 401, 402, 440 a calibration signal 106, 107, 206, 406, 335 for radiation by the respective antenna element 101, 102, 201, 202, 401, 402, 440 and to supply the generated calibration signals 106, 107, 206, 406, 335 to the respective antenna elements 101, 102, 201, 202, 401, 402, 440. Further, the present invention provides a measurement device 330, 430 for measuring properties 336 of a beamforming antenna 100, 200, 400 according to any one of the preceding claims via calibration signals 106, 107, 206, 406, 335 emitted by antenna elements 101, 102, 201, 202, 401, 402, 440 of the beamforming antenna 100, 200, 400, the measurement device 330, 430 comprising a measurement receiver 332 that is configured to receive an incoming signal 334 comprising the calibration signals 106, 107, 206, 406, 335, and a property determination module 333 that is coupled to the measurement receiver 332 and that is configured to determine the properties 336 of the beamforming antenna 100, 200, 400 based on the received calibration signals 106, 107, 206, 406, 335. Further, the present invention provides a respective antenna measurement system 450 and a respective method.

LIST OF REFERENCE SIGNS 100, 200, 400 beamforming antenna
101, 102, 201, 202, 401, 402, 440 antenna element
103, 403 signal generator
104, 105 signal output interface
106, 107, 206, 406 calibration signal
208 signal generation element
110, 111, 210, 211, 410, 411, 441 signal processing chain
212 combiner
213 DAC
214 up converter
215 amplifier
216 filter
220, 420 beamforming logic
221 IQ signal
225 coupler
226 switch
227 filter
228 calibration receiver
330, 430 measurement device
331 antenna
332 measurement receiver
333 property determination module
334 incoming signal
335 calibration signal
336 properties
337 correlator
450 antenna measurement system
h1, h2, hn signal path
S1, S2, S3, S4 method steps

The invention claimed is:

1. Beamforming antenna comprising:
a plurality of antenna elements;
a signal generator coupled to each of the plurality of antenna elements by a unique one of a plurality of signal processing chains, each of the signal processing chains defining a unique signal transmission path between one of a plurality of signal output interfaces of the signal generator and an input of one of the antenna elements, the signal generator configured to generate for each one of the antenna elements a calibration signal having a signature unique to each antenna element for radiation by the respective antenna element and to supply the generated calibration signals to the respective antenna elements;
a plurality of couplers, a respective one of the couplers coupled in each unique signal transmission path between the signal processing chain and the antenna element, the coupler operable to couple out a fraction of the signals provided to the antenna element and provide the signal fractions to a switch for selecting one of the signal fractions; and
a calibration receiver coupled through the switch to each of the plurality of couplers, the calibration receiver configured to receive the signal fractions as selected by the switch.

2. Beamforming antenna according to claim 1, wherein the signal generator is configured to generate orthogonal signals or quasi-orthogonal signals as calibration signals.

3. Beamforming antenna according to claim 1, wherein the signal generator is configured to generate pseudo noise signals as calibration signals.

4. Beamforming antenna according to claim 3, wherein the signal generator is configured to generate band-limited pseudo noise signals as calibration signals.

5. Beamforming antenna according to claim 1, wherein the signal generator comprises a plurality of signal output interfaces, each signal output interface of the plurality of signal output interfaces coupled to a different one of the signal processing chains of each respective antenna element.

6. Beamforming antenna according to claim 5, wherein the signal processing chain of the respective antenna element comprises a digital to analog converter.

7. Beamforming antenna according to claim 1, further comprising a beamforming logic that is coupled to the antenna elements and that is configured to calculate antenna output signals based on incoming IQ signals and a respective beamforming information and to provide the antenna output signals to the single antenna elements, wherein the signal generator is coupled to an input of the beamforming logic and is configured to provide the calibration signals as an IQ signal to the beamforming logic.

8. Beamforming antenna according to claim 1, further comprising a control interface that is configured to receive and/or transmit control commands.

9. Beamforming antenna according to claim 8 further comprising:
a measurement device, wherein the control interface that is configured to receive and/or transmit control commands to the measurement device.

10. Measurement device for measuring properties of a beamforming antenna via calibration signals emitted by antenna elements of the beamforming antenna, each antenna element coupled by a unique one of a plurality of signal processing chains to a different one of a plurality of signal output interfaces of the signal generator, each of the signal processing chains defining a unique signal transmission path between each one of the signal output interfaces of the signal generator and an input of each one of the antenna elements, the measurement device comprising:
a plurality of couplers each configured to transmit an incoming signal exiting the unique signal transmission path of a signal processing chain of the signal processing chains, the incoming signal comprising calibration signals, the couplers operable to couple out a fraction of the incoming signals provided to the antenna element and provide the signal fractions to a switch for selecting one of the signal fractions;
a measurement receiver configured to receive the signal fractions of the incoming signals comprising the calibration signals, the measurement receiver configured to receive the signal fractions as selected by the switch, and
a property determination module that is coupled to the measurement receiver and that is configured to determine properties of each of the signal processing chains for each individually identifiable one of the antenna elements of the beamforming antenna based on unique signatures of the received calibration signals.

11. Measurement device according to claim 10, wherein the measurement receiver is configured to receive the incoming signal comprising orthogonal calibration signals and to separate the orthogonal calibration signals and to provide the separated orthogonal calibration signals to the property determination module.

12. Measurement device according to claim 10 further comprising a number of correlators, wherein the correlators are configured to correlate the received signal with predetermined pseudo noise signals to extract the calibration signals from the received signal fractions.

13. Measurement device according to claim 10 comprising a control interface that is configured to receive and/or transmit control commands.

14. Measurement device according to 13, wherein the control interface that is configured to receive and/or transmit control commands from the beamforming antenna.

15. Method for measuring properties of a beamforming antenna, the method comprising:
generating, by a signal generator, for each one of a plurality of antenna elements of the beamforming antenna a respective calibration signal having a unique signatures,
transmitting the calibration signals via signal processing chains to the antenna elements, each signal processing chain coupled to and defining a unique signal transmission path between an unique one of the antenna elements and an unique of one of a plurality of signal output interfaces of the signal generator;
emitting the generated calibration signals via the antenna elements of the beamforming antenna,
coupling, by couplers connected to each signal processing chain, out fractions of the signals provided to the antenna elements;
individually selecting, via a switch connected to outputs of the couplers, a selected signal fraction from the signal fractions provided by the couplers,
receiving the selected signal fraction that include the calibration signals at a measurement device, and
determining properties of signal processing chain of the beamforming antenna based on the received calibration signals within the selected signal fraction.

16. Method according to claim 15, wherein generating calibration signals comprises generating orthogonal signals or quasi-orthogonal signals as calibration signals, and wherein the method further comprises separating the orthogonal calibration signals in the measurement device prior to determining the properties of signal processing chains of the beamforming antenna.

17. Method according to claim 15, wherein generating calibration signals comprises generating pseudo noise signals, and wherein the method further comprises correlating the received calibration signals with predetermined pseudo noise signals to extract the calibration signals from the signal received at the measurement device.

18. Method according to claim 17, wherein generating calibration signals comprises generating band-limited pseudo noise signals as calibration signals.

19. Method according to claim 15, further comprising, calculating antenna output signals based on incoming IQ signals and a respective beamforming information and providing the antenna output signals to the single antenna elements.

20. Method according to claim 15, further comprising receiving and/or transmitting commands from the measurement device to a control interface.

* * * * *